(12) United States Patent
Yoshida et al.

(10) Patent No.: US 7,581,379 B2
(45) Date of Patent: Sep. 1, 2009

(54) GAS TURBINE POWER GENERATING MACHINE

(75) Inventors: Shouhei Yoshida, Hitachiohta (JP); Yoshitaka Hirata, Tokai (JP); Hiroshi Inoue, Mito (JP); Nariyoshi Kobayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/265,190

(22) Filed: Nov. 3, 2005

(65) Prior Publication Data

US 2009/0173057 A1 Jul. 9, 2009

(30) Foreign Application Priority Data

Nov. 4, 2004 (JP) .............................. 2004-320976

(51) Int. Cl.
*F02C 3/20* (2006.01)
(52) U.S. Cl. .................... 60/39.463; 60/39.465; 60/734
(58) Field of Classification Search .............. 60/39.281, 60/39.463, 39.465, 734, 737
See application file for complete search history.

(56) References Cited

U.S. PATENT DOCUMENTS

| | | | | |
|---|---|---|---|---|
| 4,160,479 A | * | 7/1979 | Richardson et al. | ......... 166/267 |
| 5,685,155 A | * | 11/1997 | Brown et al. | ................... 60/698 |
| 6,161,386 A | | 12/2000 | Lokhandwala | |
| 6,779,333 B2 | * | 8/2004 | Gerhold | ..................... 60/39.53 |
| 6,813,889 B2 | | 11/2004 | Inoue et al. | |
| 7,114,322 B2 | * | 10/2006 | Yamanaka et al. | ....... 60/39.465 |
| 2006/0042259 A1 | * | 3/2006 | Marushima et al. | ........... 60/772 |

FOREIGN PATENT DOCUMENTS

| | | |
|---|---|---|
| CN | 1401938 | 3/2003 |
| JP | 2002-327629 | 11/2002 |
| JP | 2003-166428 | 6/2003 |

* cited by examiner

*Primary Examiner*—Louis J Casaregola
(74) *Attorney, Agent, or Firm*—Mattingly & Malur, PC

(57) ABSTRACT

The plant includes a gaseous fuel processing apparatus for pre-processing natural gas (gaseous fuel) produced in the gas field, a liquid fuel processing apparatus for pre-processing liquid fuel obtained during the extraction and refining process of the natural gas, and a gas turbine. The gas turbine includes a compressor for generating compressed air, a combustor for mixing the compressed air from the compressor with one or both of the gaseous fuel pre-processed by the gaseous fuel processing apparatus and the liquid fuel pre-processed by the liquid fuel processing apparatus, and for burning a gas mixture, and a turbine for driving a generator by combustion gases supplied from the combustor.

6 Claims, 10 Drawing Sheets

GAS TURBINE POWER GENERATING MACHINE

BACKGROUND OF THE INVENTION

1. Field of the Invention

The present invention relates to a gas turbine power generating machine. More particularly, the present invention relates to a gas turbine power generating machine which is installed near gas fields or oil fields and which transmits generated electricity to a consuming area through a power transmission system.

2. Description of the Related Art

In view of environmental pollution in worldwide scale, regulations on exhaust gases from various engines have been urged in progress. Under such situations, natural gas is increasingly employed as fuel giving less influence upon environments. Natural gas produced in a gas field is transported to a consuming area, for example, by a method of liquefying the natural gas with a liquefaction facility near the gas field and transporting the liquefied natural gas to the consuming area by land or sea, or by a method of transporting the natural gas, as it is, to the consuming area through pipelines. The pipelines include several booster stations for boosting the pressure of natural gas to compensate for a pressure loss caused while the natural gas flows through the pipelines. The interval between the booster stations is, e.g., several tens to several hundreds kilometers. Constructions of general gas-turbine power generating machine are disclosed in, e.g., Patent Document 1 (JP,A 2003-166428) and Patent Reference 2 (JP,A 2002-327629).

SUMMARY OF THE INVENTION

However, the above-described related art has problems as follows.

The related art requires a great deal of initial investment for the gas liquefaction facility, the pipelines, etc. Also, in medium- or small-scaled gas fields and in gas fields that have become overage with the progress of gas extraction, outturn is relatively small and a profit is no longer expected because of an increase in cost of the fuel transporting system relative to the outturn. For that reason, the natural gas (gaseous fuel) extracted from the medium- or small-scaled gas fields and the overage gas fields has not been transported to the consuming area and hence has not been effectively utilized. Further, for liquid fuel such as associated oil produced concurrently during the extraction of natural gas and condensates (hydrocarbons being liquid at room temperature and atmospheric pressure) generated in the refining process of natural gas, it is hard to ensure a profit because of an increase in the fuel transporting cost as in the above-mentioned case. Therefore, that liquid fuel has not also been effectively utilized. In medium- or small-scaled oil fields and overage oil fields, it is similarly hard to ensure a profit because of an increase in the fuel transporting cost as in the above-mentioned gas fields. Therefore, crude oil (liquid fuel) and gaseous fuel, such as associated gas produced concurrently during oil extraction, have not been effectively utilized in the past.

Accordingly, an object of the present invention is to provide a gas turbine power generating machine which can effectively utilize natural gas extracted from medium- or small-scaled gas fields and overage gas fields, liquid fuel produced during the extraction and refining process of the natural gas, as well as liquid fuel and gaseous fuel, such as associated gas, produced in medium- or small-scaled oil fields and overage oil fields.

(1) To achieve the above object, the present invention provides a gas turbine power generating machine installed near a gas field and/or an oil field and transmitting generated electricity to a consuming area through a power transmission system, the gas turbine power generating machine comprising a gaseous fuel processing apparatus for pre-processing natural gas produced in the gas field and/or gaseous fuel, including associated gas, produced in the oil field; a liquid fuel processing apparatus for pre-processing liquid fuel obtained during extraction and a refining process of the natural gas and/or liquid fuel produced in the oil field; and a gas turbine comprising a compressor for generating compressed air, a combustor for mixing the compressed air from the compressor with one or both of the gaseous fuel pre-processed by the gaseous fuel processing apparatus and the liquid fuel pre-processed by the liquid fuel processing apparatus, and for burning a gas mixture, and a turbine for driving a generator by combustion gases supplied from the combustor.

The gas turbine power generating machine according to the present invention is installed near, e.g., a medium- or small-scaled gas field or an overage gas field. The gaseous fuel and the liquid fuel are pre-processed respectively by the gaseous fuel processing apparatus and the liquid fuel processing apparatus. The gas turbine generates electric power by using one or both of the pre-processed gaseous fuel and liquid fuel, and the generated electric power is transmitted to the consuming area through the power transmission system. Thus, the cost is cut with elimination of not only pipelines for transporting the gaseous fuel, but also liquefaction equipment, transportation equipment, etc. for liquefying and transporting the gaseous fuel, whereby the gaseous fuel and the liquid fuel both having been left unused in the past can be effectively utilized. It is therefore possible to effectively utilize natural gas extracted from medium- or small-scaled gas fields and overage gas fields, and liquid fuel produced during the extraction and refining process of the natural gas.

(2) In above (1), preferably, the gas turbine power generating machine further comprises an amount-of-produced gaseous fuel sensor for detecting an amount of the gaseous fuel produced and pre-processed by the gaseous fuel processing apparatus; an amount-of-produced liquid fuel sensor for detecting an amount of the liquid fuel produced and pre-processed by the liquid fuel processing apparatus; an exhaust gas temperature sensor for detecting a temperature of exhaust gas of the turbine; a power output sensor for detecting a power output generated by the generator; and a fuel supply control unit for controlling supply of the gaseous fuel and the liquid fuel to the combustor depending on results detected by the sensors.

(3) In above (2), preferably, the fuel supply control unit controls respective amounts of the gaseous fuel and the liquid fuel supplied to the combustor such that the exhaust gas temperature detected by the exhaust gas temperature sensor does not exceed a predetermined upper limit value.

(4) In above (3), preferably, the fuel supply control unit executes control such that only the gaseous fuel is supplied to the combustor until the power output detected by the power output sensor reaches a predetermined intermediate output, and such that the gaseous fuel and the liquid fuel are both supplied to the combustor after the power output detected by the power output sensor exceeds the predetermined intermediate output.

(5) In above (3) or (4), preferably, the fuel supply control unit executes control such that the gaseous fuel is supplied to the combustor at a maximum limit of the amount of the produced gaseous fuel, which is detected by the amount-of-produced gaseous fuel sensor, and such that the liquid fuel is supplied to the combustor in amount to compensate for a deficiency in amount of the supplied gaseous fuel.

(6) In any one of above (1)-(5), preferably, the combustor comprises a liquid fuel atomizer for atomization of the liquid fuel; a mixing chamber wall having a hollow conical shape gradually spreading in the direction of the atomization of the liquid fuel atomizer and defining a mixing chamber therein with the liquid fuel atomizer disposed at a center of the mixing chamber wall; a plurality of air inlet holes bored in the mixing chamber wall and introducing the compressed air supplied from the compressor such that angles at which the compressed air is introduced to the mixing chamber are deviated at least toward the circumferential direction of the mixing chamber; and a plurality of gaseous fuel nozzles disposed on the outer side of the mixing chamber wall in opposed relation to the air inlet holes and ejecting the gaseous fuel in directions substantially coaxial with respective axes of the air inlet holes.

(7) In any one of above (1)-(5), preferably, the combustor comprises a pilot burner and a plurality of main burners disposed around the pilot burner, each of the pilot burner and the main burners comprising a liquid fuel atomizer for atomization of the liquid fuel; a mixing chamber wall having a hollow conical shape gradually spreading in the direction of the atomization of the liquid fuel atomizer and defining a mixing chamber therein with the liquid fuel atomizer disposed at a center of the mixing chamber wall; a plurality of air inlet holes bored in the mixing chamber wall and introducing the compressed air supplied from the compressor such that angles at which the compressed air is introduced to the mixing chamber are deviated at least toward the circumferential direction of the mixing chamber; and a plurality of gaseous fuel nozzles disposed on the outer side of the mixing chamber wall in opposed relation to the air inlet holes and ejecting the gaseous fuel in directions substantially coaxial with respective axes of the air inlet holes.

According to the present invention, it is possible to effectively utilize natural gas extracted from medium- or small-scaled gas fields and overage gas fields, liquid fuel produced during the extraction and refining process of the natural gas, as well as liquid fuel and gaseous fuel, such as associated gas, produced in medium- or small-scaled oil fields and overage oil fields.

DESCRIPTION OF THE PREFERRED EMBODIMENTS

Embodiments of the present invention will be described below with reference to FIGS. 1-5.

Figure 1:
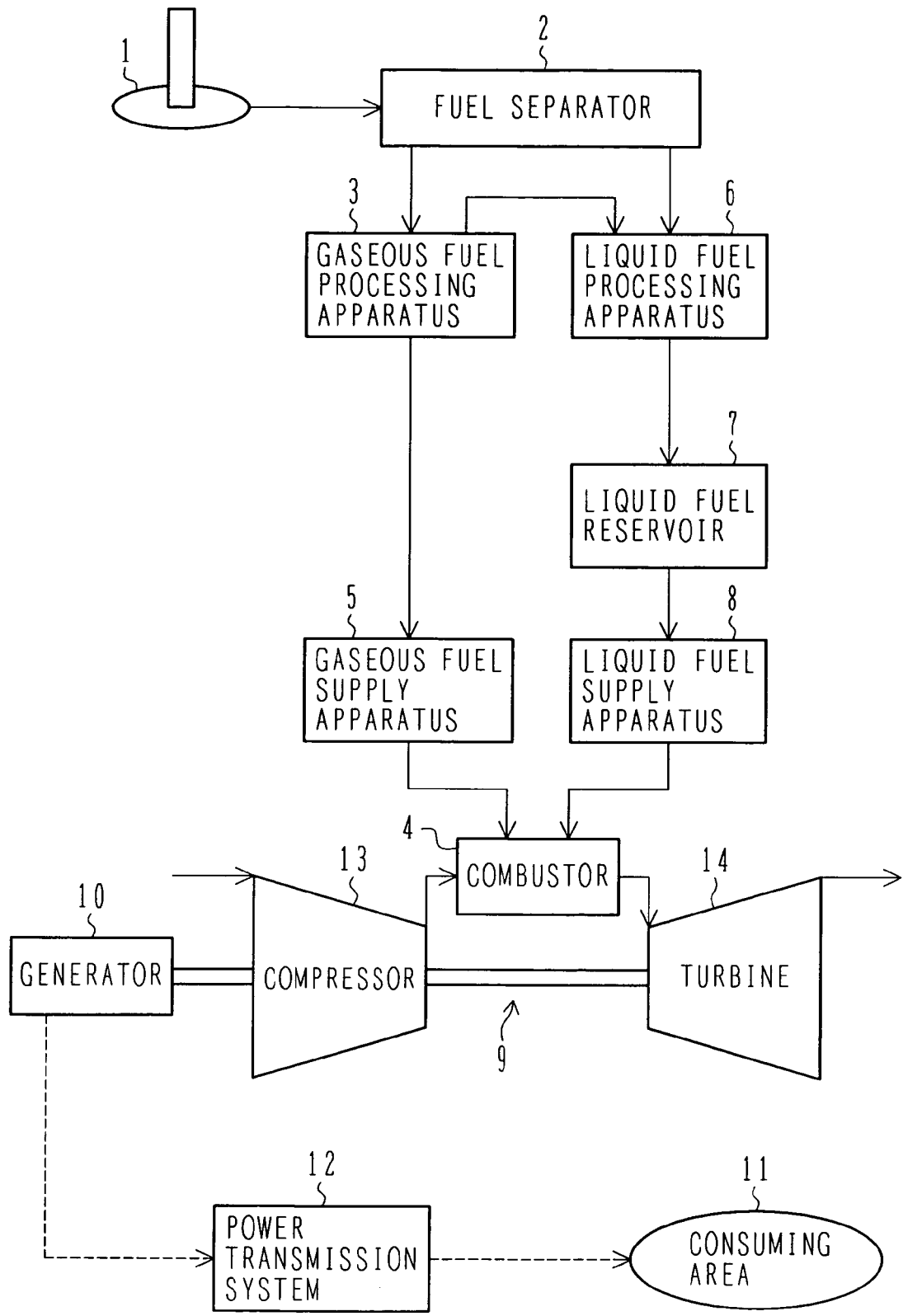
FIG. 1 is a block diagram showing an overall construction of a gas turbine power generating machine according to a first embodiment of the present invention.

FIG. 1 is a block diagram showing an overall construction of the gas turbine power generating machine according to the first embodiment. Note that this first embodiment is described, by way of example, in connection with the case using natural gas (gaseous fuel) extracted from gas fields and liquid fuel produced during the extraction and refining process of the natural gas.

Referring to FIG. 1, the gas turbine power generating machine is installed near a gas field 1. The gas turbine power generating machine comprises a fuel separator 2 for separating natural gas (gaseous fuel) from liquid gas, such as associated oil produced concurrently during extraction of the natural, a gaseous fuel processing apparatus 3 for pre-processing the natural gas separated by the fuel separator 2 to be ready for combustion, a gaseous fuel supply apparatus 5 for supplying the gaseous fuel pre-processed by the gaseous fuel processing apparatus 3 to a combustor 4 (described in detail later), a liquid fuel processing apparatus 6 for pre-processing liquid fuel, such as condensates generated in the refining process of natural gas and associated oil separated by the fuel separator 2 to be ready for combustion, a liquid fuel reservoir 7 for storing the liquid fuel pre-processed by the liquid fuel processing apparatus 6, a liquid fuel supply apparatus 8 for supplying the liquid fuel from the liquid fuel reservoir 7 to the combustor 4, a gas turbine 9 driven by using the gaseous fuel and the liquid fuel supplied respectively from the gaseous fuel supply apparatus 5 and the liquid fuel supply apparatus 8 (or one of the gaseous fuel and the liquid fuel), a generator 10 driven by the gas turbine 9 to generate electric power, and a power transmission system (power transmission means) 12 for transmitting the electric power generated by the generator 10 to a consuming area 11. The consuming area 11 may be a gas field site if there is a demand.

The gas turbine 9 comprises a compressor 13 for generating compressed air, the combustor 4 for mixing the gaseous fuel and the liquid fuel supplied respectively from the gaseous fuel supply apparatus 5 and the liquid fuel processing apparatus 8 (or one of the gaseous fuel and the liquid fuel) with the compressed air from the compressor 13 and for burning the mixture, and a turbine 14 driven by combustion gases supplied from the combustor 4. The compressor 13 and the generator 10 are coaxially coupled to the turbine 14 so that the compressor 13 and the generator 10 are driven with the operation of the turbine 14 and the generator 10 generates electric power.

Figure 2:
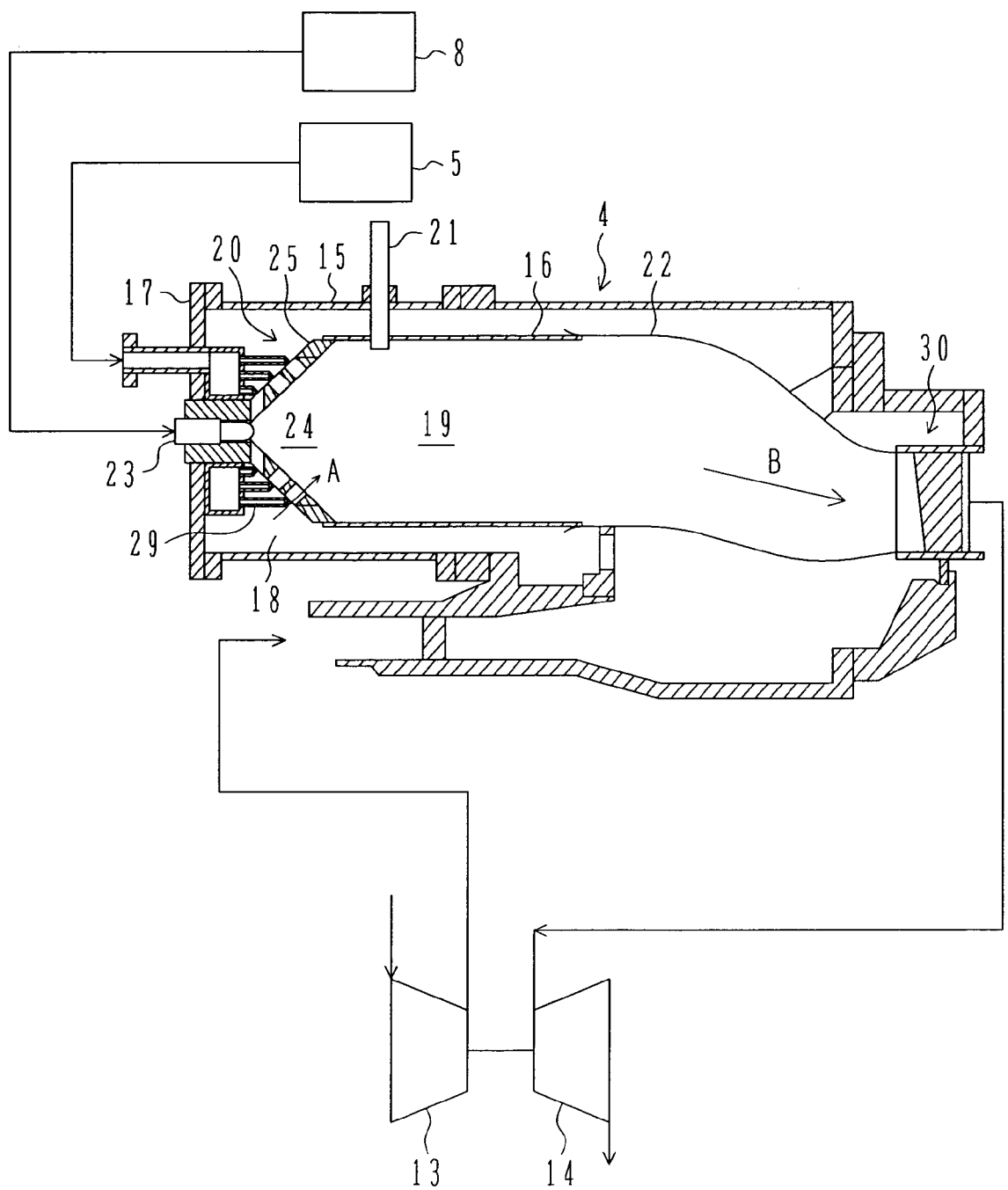
FIG. 2 is a side sectional view showing a principal structure of a combustor constituting the gas turbine power generating machine according to the first embodiment of the present invention.
Figure 3:
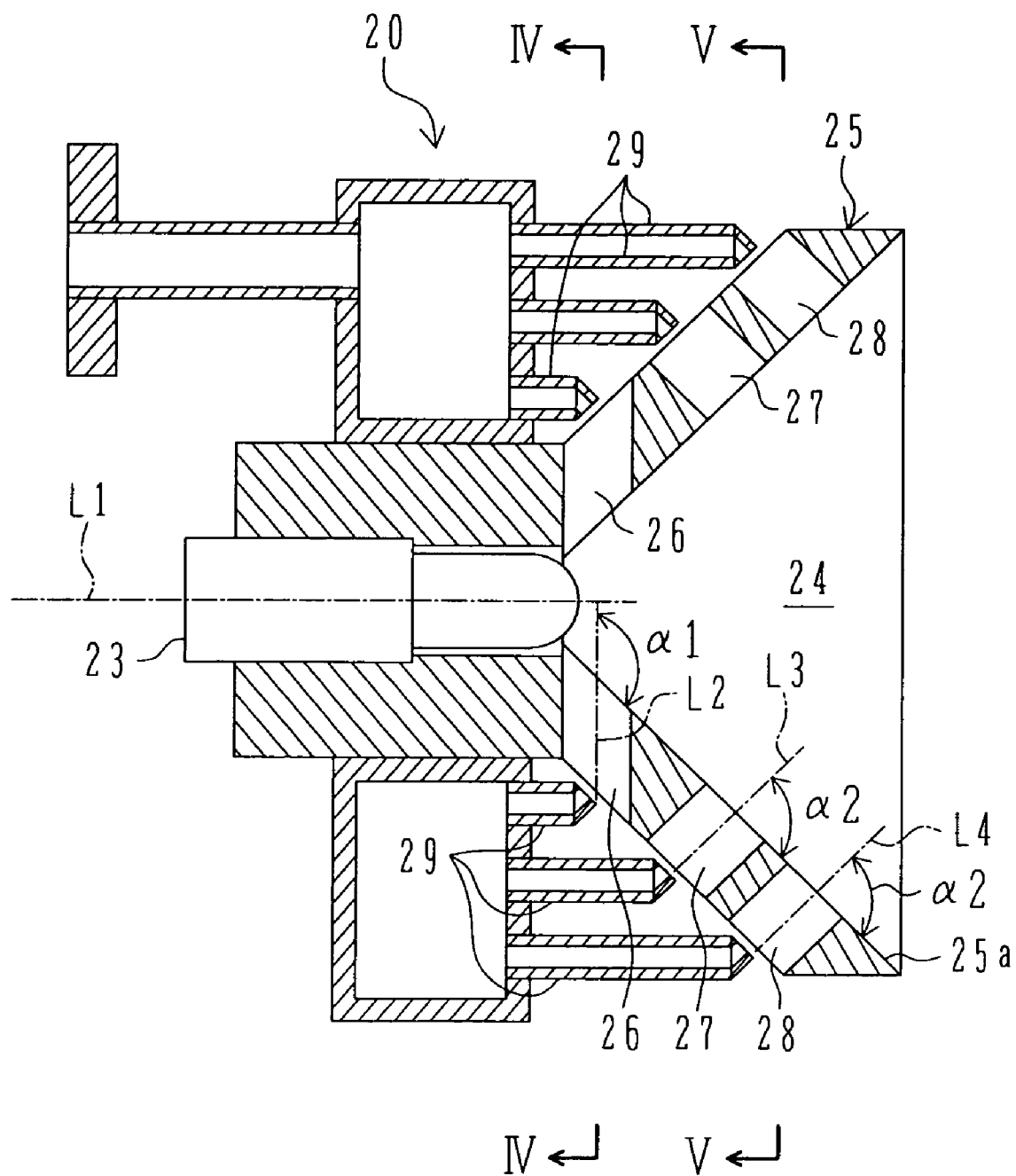
FIG. 3 is a side sectional view showing a detailed structure of a burner of the combustor constituting the gas turbine power generating machine according to the first embodiment of the present invention.
Figure 4:
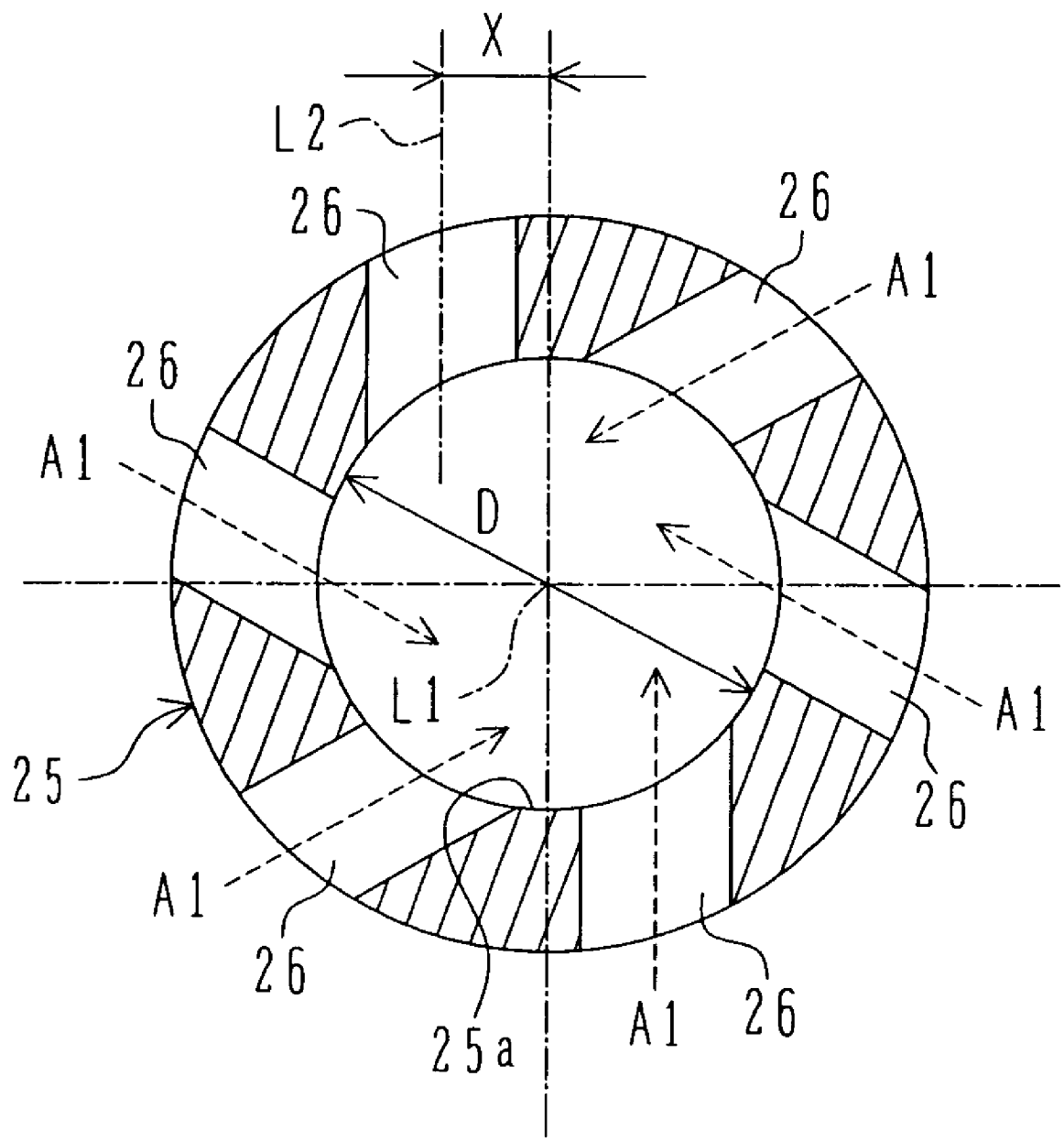
FIG. 4 is a sectional view taken along the line IV-IV in FIG. 3.
Figure 5:
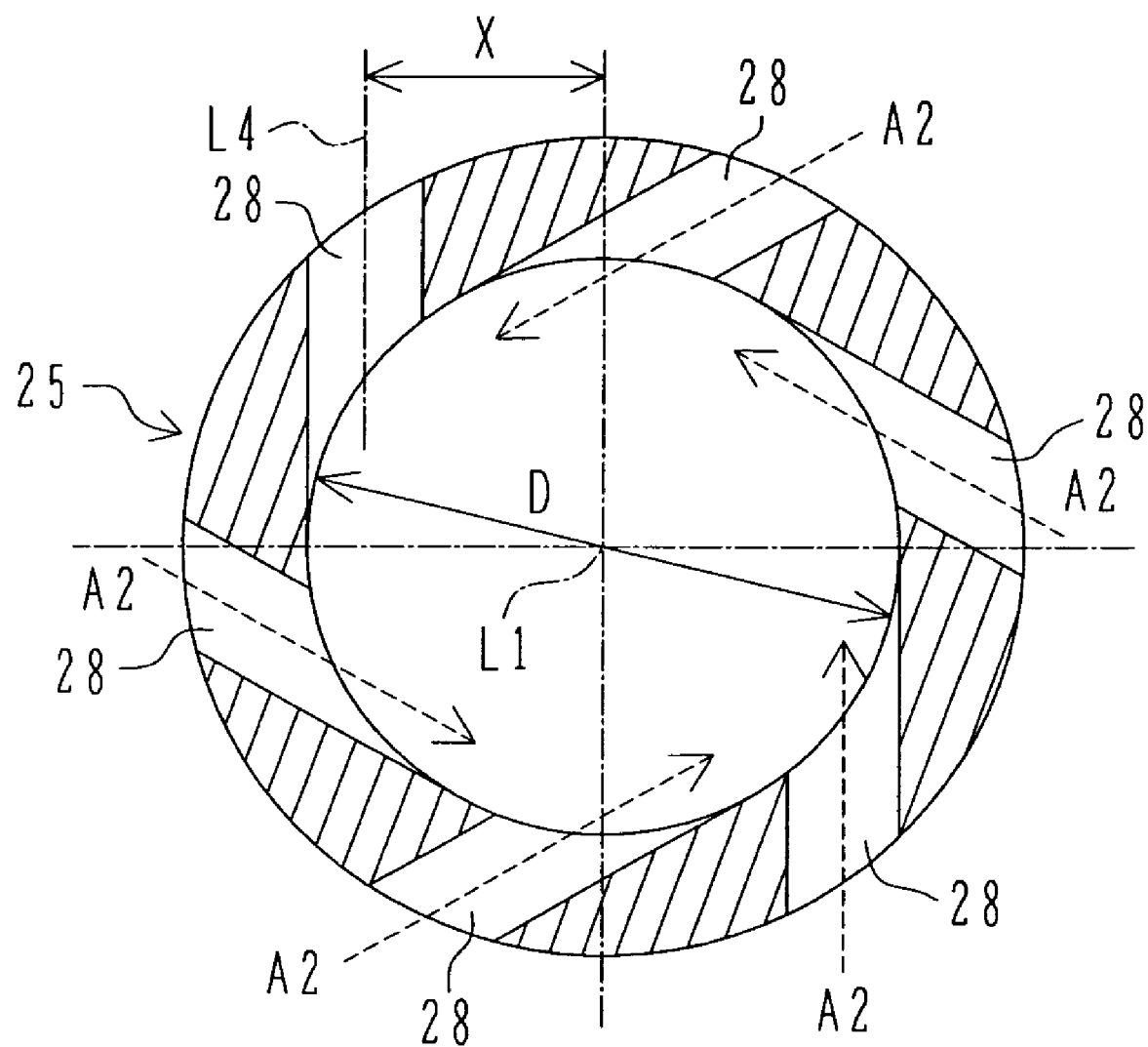
FIG. 5 is a sectional view taken along the line V-V in FIG. 3.

FIG. 2 is a side sectional view showing a principal structure of the combustor 4, FIG. 3 is a side sectional view showing a detailed structure of a burner (described later), FIG. 4 is a sectional view taken along the line IV-IV in FIG. 3, and FIG. 5 is a sectional view taken along the line V-V in FIG. 3.

Referring to FIGS. 2-5, the combustor 4 is disposed in plural at substantially equal angular intervals around the compressor 13. A casing of the combustor 4 comprises an outer casing 15 and an liner 16 each having a substantially cylindrical shape, and an end cover 17 disposed at one end (left side as viewed in FIG. 2) of the outer casing 15. The liner 16 is disposed inside the outer casing 15 with a gap left between them, and the gap defines a channel 18 for the compressed air supplied from the compressor 13. An inner space of the liner 16 defines a combustion chamber 19 for burning the compressed air and the fuel therein.

At an upstream end (left side as viewed in FIG. 2) of the liner 16, a burner 20 is disposed which ejects the fuel for mixing of the fuel with the compressed air (indicated by arrow A in FIG. 2) supplied through the compressed gas channel 18. The gas mixture from the burner 20 is introduced to the combustion chamber 19 inside the liner 16. The combustion chamber 19 inside the liner 16 is provided with an igniter 21 for igniting the gas mixture. Thus, the gas mixture is burnt to produce the combustion gases that are supplied to the turbine 14 through a transition piece 22 (as indicated by an arrow B in FIG. 2).

The burner 20 comprises a liquid fuel atomizer 23 for atomization of the liquid fuel, and a mixing chamber wall 25 having a hollow conical shape gradually spreading toward the combustion chamber 19 (to the right as viewed in FIGS. 2 and 3) and defining a mixing chamber 24 therein with the liquid fuel atomizer 23 disposed at a center (apex of the conical shape) of the mixing chamber wall 25. The liquid fuel atomizer 23 atomizes the liquid fuel in a direction substantially coaxial with an axis L1 of the mixing chamber wall 25. Air inlet holes 26, 27 and 28 for introducing, to the mixing chamber 24, the compressed air supplied through the compressed air channel 18 are bored in the mixing chamber wall 25 in plural stages (three in this embodiment) in the direction of the axis L1 and in plural points (six in this embodiment) in the circumferential direction per stage such that those air inlet holes 26, 27 and 28 are arranged successively in this order from the upstream side (i.e., from the left side as viewed in FIG. 3). Further, a plurality of gaseous fuel nozzles 29 are disposed on the outer side of the mixing chamber wall 25 in opposed relation to the air inlet holes 26, 27 and 28, respectively. The gaseous fuel nozzles 29 eject the gaseous fuel in directions substantially coaxial with respective axes L2, L3 and L4 of the air inlet holes 26, 27 and 28. Additionally, the liquid fuel is supplied to the liquid fuel atomizer 23 from the liquid fuel supply apparatus 8, and the gaseous fuel is supplied to the plurality of gaseous fuel nozzles 29 from the gaseous fuel supply apparatus 5.

The air inlet holes 26, 27 and 28 are bored in the mixing chamber wall 25 such that angles at which the compressed air is introduced through those air inlet holes are deviated at least toward the circumferential direction of the mixing chamber wall 25. Referring to FIGS. 4 and 5, X represents the offset distance between the axis L2, L4 of the air inlet hole 26, 28 and the axis L1 of the mixing chamber wall 25 (i.e., the length of a segment connecting the axis L2, L4 and the axis L1 in perpendicular relation), and D represents the inner diameter of the mixing chamber wall 25 at each axial position where the air inlet hole 26, 28 is bored. Then, the air inlet holes 26, 27 and 28 in the mixing chamber wall 25 are formed such that X/D increases as an axial position approaches the downstream side (to the right as viewed in FIG. 3). Thus, X/D takes a smaller value at the air inlet hole 26 in the upstream stage. As indicated by an arrow A1 in FIG. 4, therefore, the compressed air flows in toward the vicinity of the axis L1 of the mixing chamber wall 25 (i.e., the vicinity of the position where the liquid fuel is atomized from the liquid fuel atomizer 23). On the other hand, X/D takes a larger value at the air inlet hole 28 in the downstream stage. Therefore, the compressed air flows in substantially along an inner circumferential surface 25a of the mixing chamber wall 25, as indicated by an arrow A2 in FIG. 5.

Further, angles at which the axes L2, L3 and L4 of the air inlet holes 26, 27 and 28 extend are also changed depending on positions in the direction of the axis L1. More specifically, as shown in FIG. 3, the air inlet hole 26 in the upstream stage has a relatively large angle $\alpha 1$ between its axis L2 and the inner circumferential surface 25a of the mixing chamber wall 25 (e.g., such an angle as causing a plane including the axis L2 of the air inlet hole 26 to intersect the axis L1 substantially at a right angle). The air inlet holes 27, 28 in the intermediate and downstream stages have a relatively small angle $\alpha 2$ (e.g., about 90°) between their axes L3, L4 and the inner circumferential surface 25a of the mixing chamber wall 25. As a result, the compressed air ejected from the air inlet hole 26 in the upstream stage flows into the mixing chamber 24 substantially at a right angle relative to the axis L1 of the mixing chamber wall 25 (i.e., to the liquid fuel atomized from the liquid fuel atomizer 23).

The operation and advantages of this embodiment will be described below.

The gas turbine power generating machine of this embodiment is installed near, e.g., a medium- or small-scaled gas field or an overage gas field. The fuel separator 2 separates natural gas (gaseous fuel) from liquid fuel, such as associated oil produced concurrently during extraction of the natural gas. The gaseous fuel processing apparatus 3 pre-processes the natural gas separated by the fuel separator 2. The liquid fuel processing apparatus 6 pre-processes the liquid fuel, such as condensates generated in the refining process of natural gas and associated oil separated by the fuel separator 2. The gas turbine 9 is driven by using the pre-processed gaseous fuel and liquid fuel (or one of them), and the generator 10 generates electric power. The generated electric power is transmitted to the consuming area 11 through the power transmission system 12. Thus, the cost is cut with elimination of not only pipelines for transporting the gaseous fuel, but also liquefaction equipment, transportation equipment, etc. for liquefying and transporting the gaseous fuel, whereby the gaseous fuel and the liquid fuel both having been left unused in the past can be effectively utilized. It is hence possible to effectively utilize natural gas extracted from medium- or small-scaled gas fields and overage gas fields, and liquid fuel produced during the extraction and refining process of the natural gas.

Further, liquid fuel often contains heavy metals causing high temperature gas corrosion, e.g., vanadium, and the content of heavy metals with respect to the amount of fuel supplied to the combustor 4 (i.e., the total amount of heat generated) is specified for the purpose of suppressing the high temperature gas corrosion. Accordingly, if the content of heavy metals exceeds the specified value, the heavy metals have to be removed from the liquid fuel, thus resulting in an increase of the cost. However, since the combustor 4 in this embodiment is capable of burning both of the gaseous fuel and the liquid fuel, the combustion ratio of the liquid fuel can be reduced so that the content of heavy metals with respect to the total amount of heat generated is kept below the specified value. As a result, the necessity of removing the heavy metals in the liquid fuel is eliminated and the cost is cut correspondingly. In addition, the equipment cost can also be cut because of no need of preparing separate combustors for the gaseous fuel and the liquid fuel.

Further, the following advantages can be obtained with the burner 4 used in this embodiment.

(1) Prevention of Flush Back

In the combustor 4 used in this embodiment, the mixing chamber wall 25 has the air inlet holes 26, 27 and 28 bored therein for introducing the compressed air supplied from the compressor 13 and the gaseous fuel ejected from the gaseous fuel nozzles 29 to the mixing chamber 24 while mixing them. In other words, the mixing length in each of the air inlet holes 26, 27 and 28 is just equal to the thickness of the mixing chamber wall 25. Therefore, the compressed air and the gaseous fuel are not sufficiently mixed with each other in the air inlet holes 26, 27 and 28, whereby spontaneous ignition of the gas mixture and backward run of flames can be prevented. Also, even when burnable dust or the like is mixed in the compressed air, the dust or the like is avoided from residing in the air inlet holes 26, 27 and 28, and are immediately expelled out into the mixing chamber 24. As a result, a trouble of flames running backward and being held in the air inlet holes can be prevented.

(2) Reduction in Amount of NOx Generated

In the combustor 4 used in this embodiment, the plurality of gaseous fuel nozzles 29 are disposed on the outer side of the mixing chamber wall 25 in opposed relation to the air inlet holes 26, 27 and 28, respectively, and eject the gaseous fuel from the side upstream of the air inlet holes 26, 27 and 28 in the directions substantially coaxial with the axes L2, L3 and L4 thereof. With such an arrangement, the compressed air and the gaseous fuel are roughly mixed with each other in the air inlet holes 26, 27 and 28 (the gas mixture in this state will be referred to as "roughly mixed gas mixture" hereinafter). The roughly mixed gas mixture is ejected into the mixing chamber 24 through the air inlet holes 26, 27 and 28, and the mixing of the compressed air and the gaseous fuel is promoted with vortexes generated upon the ejection of the roughly mixed gas mixture (the gas mixture in this state will be referred to as "primary gas mixture" hereinafter). Also, as described above, the air inlet holes 26, 27 and 28 are formed such that X/D increases as an axial position approaches the downstream side of the mixing chamber wall 25. Therefore, the primary gas mixtures introduced through the plurality of air inlet holes 26 in the upstream stage collide with each other to further promote the mixing. On the other hand, the primary gas mixtures introduced through the plurality of air inlet holes 27, 28 in the intermediate and downstream stages flow in substantially along the inner circumferential surface 25a of the mixing chamber wall 25 so as to generate swirl flows. These swirl flows greatly promote the mixing of the primary gas mixtures introduced through the plurality of air inlet holes 27, 28 per stage.

The liquid fuel atomized from the liquid fuel atomizer 23 is atomized under the action of shearing force power caused by the primary gas mixtures introduced through the air inlet holes 26 in the upstream stage, and a part of the atomized liquid fuel is evaporated into gas. Then, mixing of the liquid fuel with the primary gas mixture is promoted while the atomized liquid fuel is caused to flow with the above-mentioned swirl flows generated in the mixing chamber 24. In such a way, the liquid fuel, the gaseous fuel, and the compressed air for combustion are sufficiently mixed with each other in the mixing chamber 24 to produce a homogeneous premixed gas mixture (in a state where the liquid fuel, the gaseous fuel, and the compressed air are uniformly mixed). As a result, the amount of NOx generated during the combustion can be reduced.

(3) Prevention of Coke Deposition

Because X/D takes a smaller value at the air inlet hole 26 in the upstream stage, the primary gas mixture introduced from each air inlet hole 26 flows in toward the vicinity of the axis L1 of the mixing chamber wall 25. Therefore, strong swirl forces act only in a central region while the swirl flows are attenuated and the swirl forces become relatively small in a region near the inner circumferential surface 25a of the mixing chamber wall 25. As a result, droplets of the liquid fuel atomized from the liquid fuel atomizer 23 are avoided from colliding with the inner circumferential surface 25a of the mixing chamber wall 25 under the swirl action of the swirl flows. Further, because the primary gas mixtures are introduced toward the vicinity of the fuel atomization position of the liquid fuel atomizer 23 from plural positions distributed entirely in the circumferential direction, it is possible to suppress the generation of a region where the droplets of the liquid fuel tend to stagnate. In addition, the liquid fuel droplets going to collide with the inner circumferential surface 25a of the mixing chamber wall 25 can be blown off by the primary gas mixtures introduced through the air inlet holes 26, 27 and 28. Consequently, the occurrence of coke deposition can be avoided.

(4) Improvement of Combustion Stability

The air inlet holes 26, 27 and 28 are formed such that X/D increases as an axial position approaches the downstream side of the mixing chamber wall 25. With such an arrangement, the premixed gas mixture flows into the combustion chamber 19 while generating strong swirl flows in an outlet area of the mixing chamber 24. In the outlet area of the mixing chamber 24, therefore, a recirculation zone is formed near the axis of the mixing chamber 24, and combustion stability in the combustion chamber 19 can be further improved.

(5) Suppression of Combustion Driven Oscillation

In some cases, combustion driven oscillation may occur which mean a phenomenon that the pressure in the combustor 4 (i.e., the pressures in the mixing chamber 24 and the combustion chamber 19) changes cyclically. The combustion driven oscillation is generated in several oscillation modes. If a particular oscillation mode is excited depending on the combustion state, a pressure amplitude of the combustion driven oscillation is increased. The increased pressure amplitude of the combustion driven oscillation accelerates wear of sliding surfaces of parts constituting the combustor 4. For that reason, it is important to prevent the generation of the combustion driven oscillation. In the gas turbine 9 used in this embodiment, there is a possibility of causing an oscillation mode with boundary conditions given by opposite ends of the combustor 4 (i.e., a first-stage nozzle throat 30 and an inlet portion of the combustor 4). This may lead to a risk that a pressure wave is repeatedly reflected between the first-stage nozzle throat 30, i.e., one reflecting end, and the inlet portion of the combustor 4, i.e., the other reflecting end, and that the pressure amplitude is increased with the formation of a standing wave.

In this embodiment, since the mixing chamber wall 25 having a hollow conical shape and a small reflectance is disposed in the inlet portion of the combustor 4 serving as the other reflecting end, the pressure wave is damped by the mixing chamber wall 25 when it impinges upon the mixing chamber wall 25, whereby the generation of the combustion driven oscillation can be suppressed.

A second embodiment of the present invention will be described below with reference to FIGS. 6-9. This second embodiment is intended to control respective amounts of the gaseous fuel and the liquid fuel supplied to the combustor 4.

Figure 6:
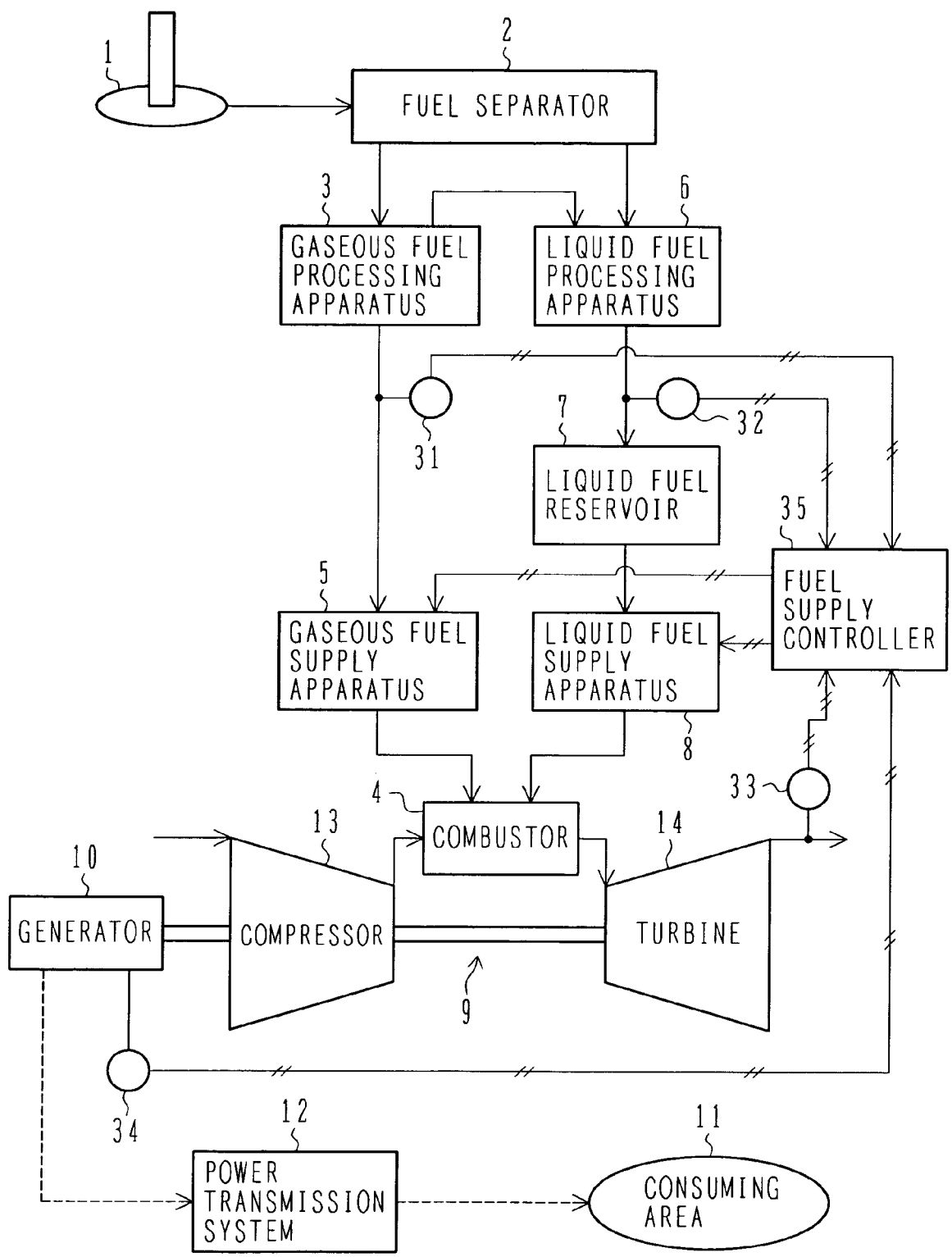
FIG. 6 is a block diagram showing an overall construction of a gas turbine power generating machine according to a second embodiment of the present invention.

FIG. 6 is a block diagram showing an overall construction of a gas turbine power generating machine according to the second embodiment. Components in FIG. 6 identical to those in the first embodiment are denoted by the same symbols and a duplicate description of those components is omitted here.

In this second embodiment, the gas turbine power generating machine additionally comprises an amount-of-produced gaseous fuel sensor 31 for detecting the amount of the gaseous fuel produced and pre-processed by the gaseous fuel processing apparatus 3, an amount-of-produced liquid fuel sensor 32 for detecting the amount of the liquid fuel produced and pre-processed by the liquid fuel processing apparatus 6, an exhaust gas temperature sensor 33 for detecting the temperature of exhaust gas of the turbine 14, a power output sensor 34 for detecting the power output generated by the generator 10, and a fuel supply controller (fuel supply control means) 35 for controlling the amounts of the gaseous fuel and the liquid fuel supplied to the combustor 4 depending on the results detected by the sensors 31-34.

The fuel supply controller 35 receives detected signals from the sensors 31-34 and executes predetermined arithmetic and logical operations to generate control signals. The control signals are outputted to the gaseous fuel supply apparatus 5 and the liquid fuel supply apparatus 8, thereby controlling the amount of the gaseous fuel supplied to the combustor 4 by the gaseous fuel supply apparatus 5 and the amount of the liquid fuel supplied to the combustor 4 by the fluid fuel supply apparatus 8. Then, for the purpose of ensuring soundness of the gas turbine 9, the fuel supply controller 35 controls the amounts of the supplied gaseous fuel and liquid fuel with respect to the flow rate of the compressed air so that the exhaust gas temperature detected by the exhaust gas temperature sensor 33 does not exceed a predetermined upper limit temperature, which has been set and stored in advance. Also, the fuel supply controller 35 controls the amounts of the supplied gaseous fuel and liquid fuel so as to adjust the power output of the generator 10 within the range where the exhaust gas temperature does not exceed the predetermined upper limit temperature. Although the fuel supply controller 35 can control the amounts of the supplied gaseous fuel and liquid fuel by changing both of those amounts, it is preferable to execute the control by changing one of the amounts of the supplied gaseous fuel and liquid fuel from the viewpoint of avoiding a complicated control process. The fuel supply control executed by the fuel supply controller 35 will be described in detail below.

Figure 7:
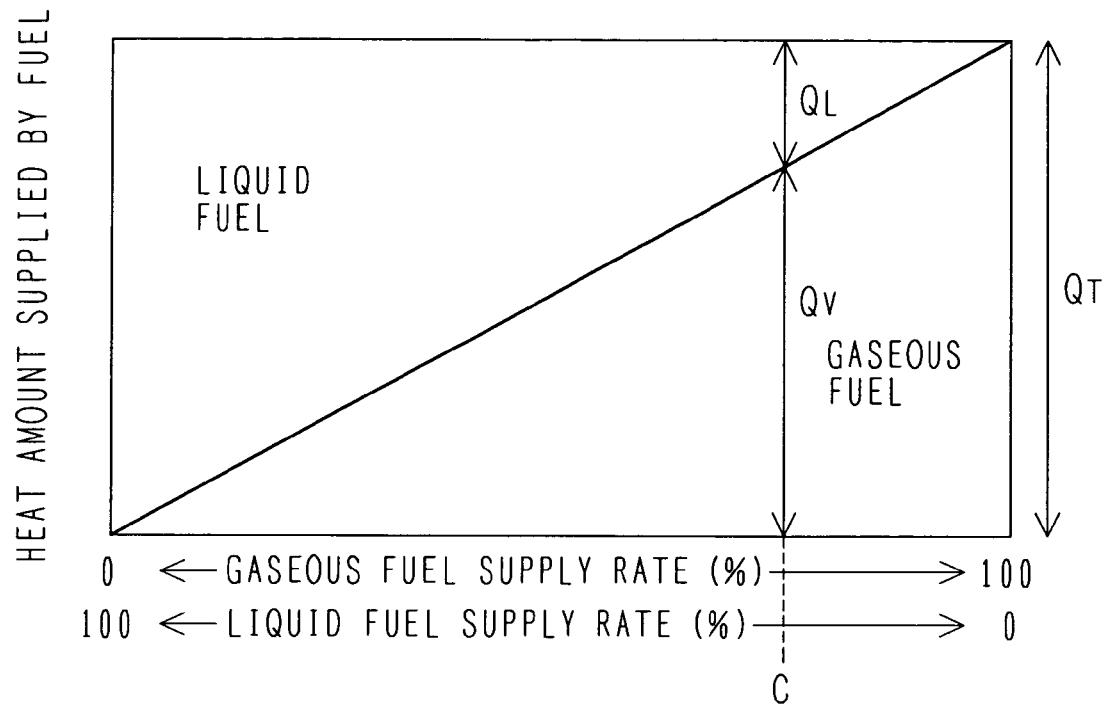
FIG. 7 is a characteristic graph showing the relationship between a gaseous-fuel/liquid-fuel supply ratio and heat amounts supplied by gaseous fuel and liquid fuel in rated-load operation of a gas turbine in the gas turbine power generating machine according to the second embodiment of the present invention.

FIG. 7 is a characteristic graph showing the relationship between a gaseous-fuel/liquid-fuel supply ratio and heat amounts supplied by the gaseous fuel and the liquid fuel in rated-load operation of the gas turbine 9.

In FIG. 7, the horizontal axis represents the gaseous-fuel/liquid-fuel supply ratio, i.e., respective supply rates of the gaseous fuel and the liquid fuel, whereas the vertical axis represents the heat amount supplied by the gaseous fuel (on the side below a slope line in FIG. 7) and the heat amount supplied by the liquid fuel (on the side above the slope line in FIG. 7). The supply rate of the gaseous fuel is increased from 0% to 100% toward the right along the horizontal axis, and the heat amount supply by the gaseous fuel is monotonously increased as the supply rate of the gaseous fuel increases. The supply rate of the liquid fuel is increased from 0% to 100% toward the left along the horizontal axis, and the heat amount supplied by the liquid fuel is monotonously increased as the supply rate of the liquid fuel increases. Then, at each point on the horizontal axis, the sum of the supply rates of the gaseous fuel and the liquid fuel is 100%, and a total supplied heat amount given as the sum of the heat amounts supplied by the gaseous fuel and the liquid fuel is set to a predetermined value $Q_T$ required for the rated-load operation of the gas turbine 9. Further, the fuel supply controller 35 is capable of not only changing the gaseous-fuel/liquid-fuel supply ratio from the supply rate 100% of the gaseous fuel to the supply rate 100% of the liquid fuel, but also setting the gaseous-fuel/liquid-fuel supply ratio to any desired value within the range where the exhaust gas temperature does not exceed the predetermined upper limit temperature. For example, when the gaseous-fuel/liquid-fuel supply ratio is set to a value indicated by a point C on the horizontal axis in FIG. 7, the heat amounts supplied by the gaseous fuel and the liquid fuel are $Q_V$, $Q_L$, respectively. One example of the fuel supply control executed by the fuel supply controller 35 from the startup of the gas turbine 9 to the rated-load operation will be described below with reference to FIG. 8.

Figure 8:
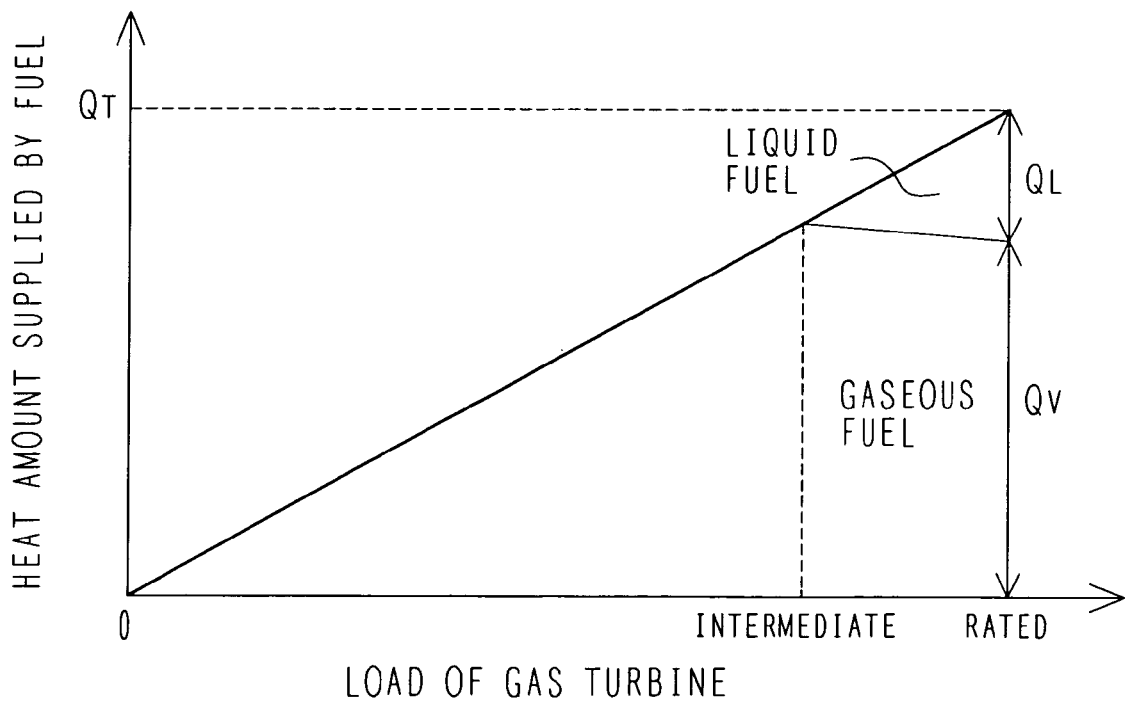
FIG. 8 is a characteristic graph showing one example of the heat amounts supplied by the gaseous fuel and the liquid fuel, which is controlled with respect to a gas turbine load by a fuel supply controller constituting the gas turbine power generating machine according to the second embodiment of the present invention.

In FIG. 8, the horizontal axis represents the load of the gas turbine 9, and the vertical axis represents the respective heat amounts supplied by the gaseous fuel and the liquid fuel. As shown, the total heat amount supplied by the gaseous fuel and the liquid fuel is monotonously increased depending on the load of the gas turbine 9. Then, the fuel supply controller 35 executes the fuel supply control as follows. Until the load (e.g., the load converted from the power output detected by the power output sensor 34) of the gas turbine 9 reaches a predetermined intermediate load, only the gaseous fuel is supplied and the heat amount supplied by the gaseous fuel is monotonously increased depending on the load. When the load of the gas turbine 9 exceeds the predetermined intermediate load, the heat amount supplied by the liquid fuel is monotonously increased while the heat amount supplied by the gaseous fuel is monotonously reduced depending on the load. Then, when the gas turbine 9 is brought into the rated-load operation, the heat amounts supplied by the gaseous fuel and the liquid fuel are given as, e.g., $Q_V$ and $Q_L$, respectively (see FIG. 7).

Figure 9:
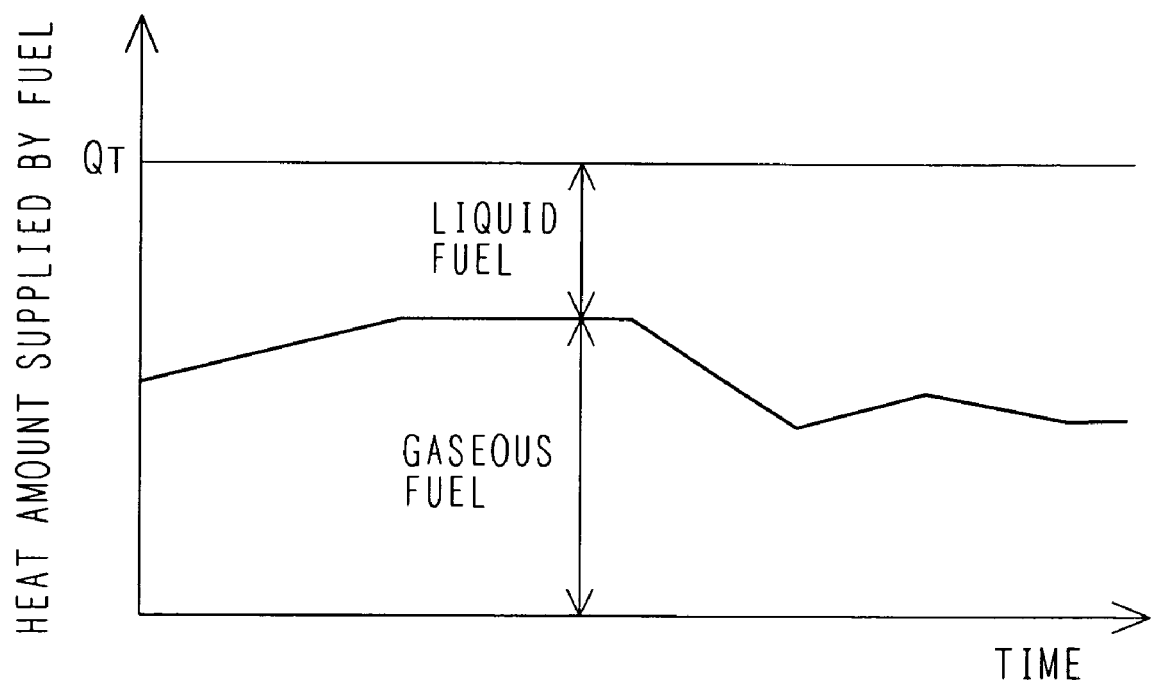
FIG. 9 is a characteristic graph showing changes with time of the heat amounts supplied by gaseous fuel and liquid fuel, which is controlled by the fuel supply controller constituting the gas turbine power generating machine according to the second embodiment of the present invention.

In some of medium- or small-scaled gas fields and overage gas fields, the outturn is relatively small, and the amounts of the gaseous fuel and the liquid fuel produced and pre-processed respectively by the gaseous fuel processing apparatus 3 and the liquid fuel processing apparatus 6 are changed. One example of the fuel supply control executed by the fuel supply controller 35 in such cases will be described below with reference to FIG. 9. FIG. 9 is a characteristic graph showing changes with time of the heat amounts supplied by the gaseous fuel and the liquid fuel in the rated-load operation of the gas turbine 9.

In FIG. 9, the horizontal axis represents time, and the vertical axis represents the respective heat amounts supplied by the gaseous fuel and the liquid fuel. The fuel supply controller 35 executes the fuel supply control such that the gaseous fuel is supplied to the combustor 4 at a maximum limit of the amount of the produced gaseous fuel, which is detected by the amount-of-produced gaseous fuel sensor 31. Under such control, the heat amount supplied by the gaseous fuel is changed with time in some cases. In that state, if the heat amount supplied by the gaseous fuel is insufficient in comparison with the total supplied heat amount $Q_T$ required for the rated-load operation of the gas turbine 9, the heat amount supplied by the liquid fuel is controlled so as to compensate for the deficiency (within the range where the exhaust gas temperature does not exceed the predetermined upper limit temperature). As a result, the gas turbine power generating machine can be adapted for the case where the amounts of the gaseous fuel and the liquid fuel produced in the medium- or small-scaled gas fields and the overage gas fields are changed, and can stably supply electric power to the consuming area 11. Further, even when the amounts of the produced gaseous fuel and liquid fuel are temporarily reduced to an insufficient level, this situation can be coped with by employing the liquid fuel stored in the liquid fuel reservoir 7 and increasing the heat amount supplied by the liquid fuel. Thus, stably power supply is ensured.

As with the first embodiment, the second embodiment is also able to effectively utilize natural gas extracted from medium- or small-scaled gas fields and overage gas fields, and liquid fuel produced during the extraction and refining process of the natural gas.

While the second embodiment has been described, by way of example, in connection with the case where the fuel supply controller 35 receives the detected signals from the sensors 31-34 and executes the predetermined arithmetic and logical operations, the present invention is not limited to such a process. For example, a liquid-fuel storage amount sensor for detecting the amount of the liquid fuel stored in the liquid fuel reservoir 7 may be disposed, and a detected signal from that sensor may be inputted to the fuel supply controller 35 to execute the predetermined arithmetic and logical operations. This modification can also provide similar advantages to those described above.

While the above embodiments have been described, by way of example, in connection with the case of the combustor 4 being provided with one burner 20, the present invention is not limited to that case, and the combustor 4 may be provided with a plurality of burners. Such a modification will be described in detail below with reference to FIGS. 10 and 11.

Figure 10:
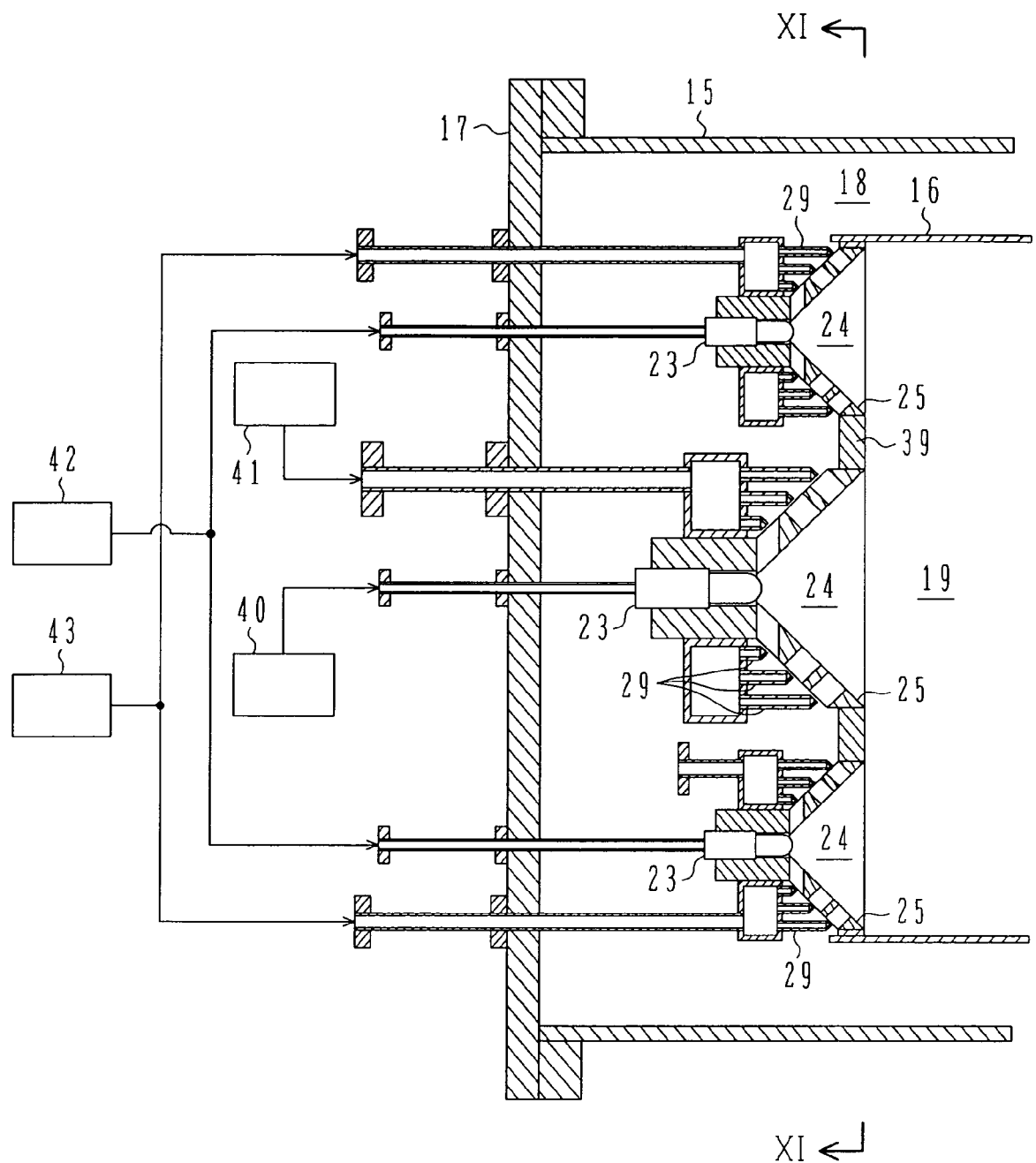
FIG. 10 is a side sectional view showing a principal structure of a combustor constituting one modification of the gas turbine power generating machine according to the present invention.
Figure 11:
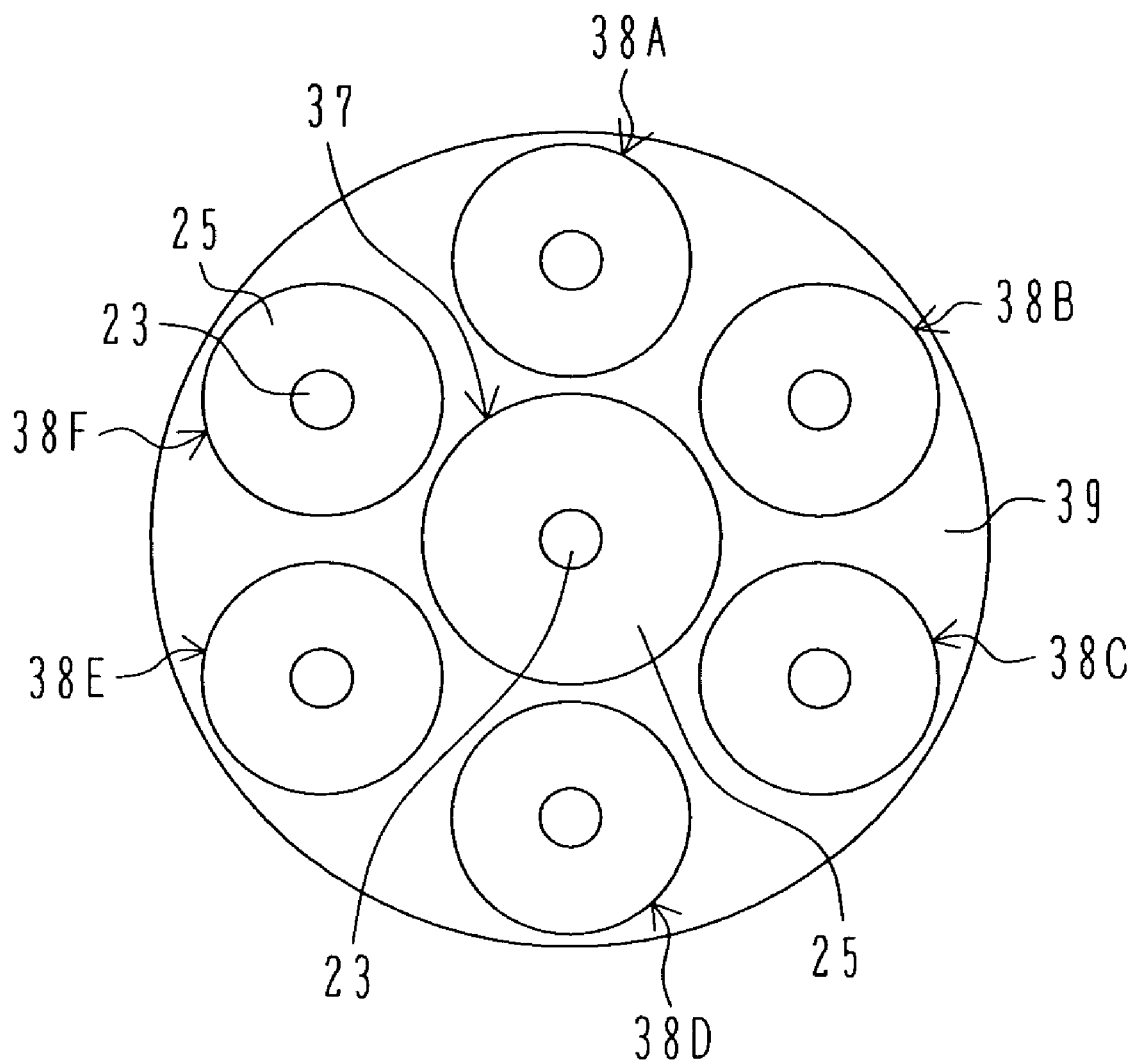
FIG. 11 is a sectional view taken along the line XI-XI in FIG. 10.

FIG. 10 is a side sectional view showing a principal structure of a combustor according to the modification, and FIG. 11 is a sectional view taken along the line XI-XI in FIG. 10. Components in FIGS. 10 and 11 identical to those in the above embodiments are denoted by the same symbols and a duplicate description of those components is omitted here.

A combustor 36 according to the modification comprises a pilot burner 37 and a plurality of main burners 38A-38F disposed around the pilot burner 37. Gas mixtures ejected from these burners 37 and 38A-38F are introduced to a combustion chamber 19 defined in an liner 16. A plate 39 is disposed between an outlet of the pilot burner 37 and outlets of the main burners 38A-38F to assist stable combustion. The burners 37 and 38A-38F are each of a similar structure to that of the burner 20 in the above-described embodiments though differing in size. Liquid fuel is supplied from a first liquid fuel supply apparatus 40 to a liquid fuel atomizer 23 of the pilot burner 37, and gaseous fuel is supplied from a first gaseous fuel supply apparatus 41 to a gaseous fuel injector 29 of the pilot burner 37. Also, liquid fuel is supplied from a second liquid fuel supply apparatus 42 to liquid fuel atomizers 23 of the main burners 38A-38F, and gaseous fuel is supplied from a second gaseous fuel supply apparatus 43 to gaseous fuel injectors 29 of the main burners 38A-38F.

When the gas turbine 9 is started up or its rotation speed is increased, fuel is supplied to only the pilot burner 37 while a ratio of the amount of supplied fuel to the flow rate of compressed air (i.e., so-called fuel/air ratio) is set to a relatively high value, thereby performing stable combustion in a state close to diffusive combustion. On the other hand, when the gas turbine 9 is operated at a low or rated load, fuel is supplied to both the pilot burner 37 and the main burners 38A-38F while the fuel/air ratio is set to a relatively low value, thereby promoting mixing of the air and the fuel to reduce the amount of NOx generated. Supply ratios between the gaseous fuel and the liquid fuel supplied to the pilot burner 37 and the main burners 38A-38F may be set to different values or the same value. Also, a fuel supply method may be modified, for example, such that only the liquid fuel is supplied to any of the pilot burner 37 and the main burners 38A-38F, and only the gaseous fuel is supplied to the others.

While the above embodiments have been described, by way of example, in connection with the case where the gas turbine power generating machine is installed near a gas field and employs natural gas (gaseous fuel) extracted from the gas field and liquid fuel produced during the extraction of natural gas and the refining process thereof, the present invention is not limited to that case. For example, the gas turbine power generating machine may be installed near an oil field and may employ liquid fuel extracted from the oil field (e.g., petroleum and residual oil obtained in the refining process thereof), and gaseous fuel, such as associated gas, produced concurrently with the extraction of oil. This makes it possible to effectively utilize liquid fuel and gaseous fuel, such as associated gas, produced in medium- or small-scaled oil fields and overage oil fields.

When the outturn in a gas or oil field is small and a small-sized gas turbine of, e.g., 10,000 kW class is installed, the gas turbine and other associated equipment may be assembled in a packaged structure so that a power generating machine can be easily conveyed by transporting means, such as a trailer. The equipment cost can be cut in that case.

What is claimed is:

1. A gas turbine power generating machine installed near a gas field and/or an oil field and transmitting generated electricity to a consuming area through power transmission means, said gas turbine power generating machine comprising:

a gaseous fuel processing apparatus for pre-processing natural gas produced in said gas field and/or gaseous fuel, including associated gas, produced in said oil field;

a liquid fuel processing apparatus for pre-processing liquid fuel obtained during extraction and a refining process of the natural gas and/or liquid fuel produced in said oil field; and a gas turbine comprising a compressor for generating compressed air, a combustor for mixing the compressed air from said compressor with both of the gaseous fuel pre-processed by said gaseous fuel processing apparatus and the liquid fuel pre-processed by said liquid fuel processing apparatus, and for burning a gas mixture, and a turbine for driving a generator by combustion gases supplied from said combustor, wherein said combustor comprises:

a liquid fuel atomizer for atomization of the liquid fuel;

a pre-mixing chamber wall having a hollow conical shape gradually spreading in the direction of the atomization of said liquid fuel atomizer and defining a pre-mixing chamber therein with said liquid fuel atomizer disposed at a center of said pre-mixing chamber wall;

a plurality of air inlet holes bored in said pre-mixing chamber wall and introducing the compressed air supplied from said compressor such that angles at which the compressed air is introduced to said pre-mixing chamber are deviated at least toward the circumferential direction of said pre-mixing chamber; and a plurality of gaseous fuel nozzles disposed on the outer side of said pre-mixing chamber wall in opposed relation to said air inlet holes and ejecting the gaseous fuel in directions substantially coaxial with respective axes of said air inlet holes.

2. The gas turbine power generating machine according to claim 1, further comprising:
a volume-of-produced gaseous fuel sensor for detecting a volume of the gaseous fuel produced and pre-processed by said gaseous fuel processing apparatus;
a volume-of-produced liquid fuel sensor for detecting a volume of the liquid fuel produced and pre-processed by said liquid fuel processing apparatus;
an exhaust gas temperature sensor for detecting a temperature of exhaust gas of said turbine;
a power output sensor for detecting a power output generated by said generator; and
fuel supply control means for controlling supply of the gaseous fuel and the liquid fuel to said combustor depending on results detected by said sensors.

3. The gas turbine power generating machine according to claim 2, wherein said fuel supply control means controls respective volumes of the gaseous fuel and the liquid fuel supplied to said combustor such that the exhaust gas temperature detected by said exhaust gas temperature sensor does not exceed a predetermined upper limit value.

4. The gas turbine power generating machine according to claim 3, wherein said fuel supply control means executes control such that only the gaseous fuel is supplied to said combustor until the power output detected by said power output sensor reaches a predetermined intermediate output, and such that the gaseous fuel and the liquid fuel are both supplied to said combustor after the power output detected by said power output sensor exceeds the predetermined intermediate output.

5. The gas turbine power generating machine according to claim 3, wherein said fuel supply control means executes control such that the gaseous fuel is supplied to said combustor at a maximum limit of the volume of the produced gaseous fuel, which is detected by said volume-of-produced gaseous fuel sensor, and such that the liquid fuel is supplied to said combustor in a volume to compensate for a deficiency in a volume of the supplied gaseous fuel.

6. The gas turbine power generating machine according claim 1, wherein said combustor comprises a pilot burner and a plurality of main burners disposed around said pilot burner, each of said pilot burner and said main burners comprising:
a liquid fuel atomizer for atomization of the liquid fuel;
a pre-mixing chamber wall having a hollow conical shape gradually spreading in the direction of the atomization of said liquid fuel atomizer and defining a pre-mixing chamber therein with said liquid fuel atomizer disposed at a center of said pre-mixing chamber wall;
a plurality of air inlet holes bored in said pre-mixing chamber wall and introducing the compressed air supplied from said compressor such that angles at which the compressed air is introduced to said pre-mixing chamber are deviated at least toward the circumferential direction of said pre-mixing chamber; and
a plurality of gaseous fuel nozzles disposed on the outer side of said pre-mixing chamber wall in opposed relation to said air inlet holes and ejecting the gaseous fuel in directions substantially coaxial with respective axes of said air inlet holes.

* * * * *